May 5, 1936.  S. G. JONES  2,040,002
UNIVERSAL JOINT
Filed Jan. 17, 1931
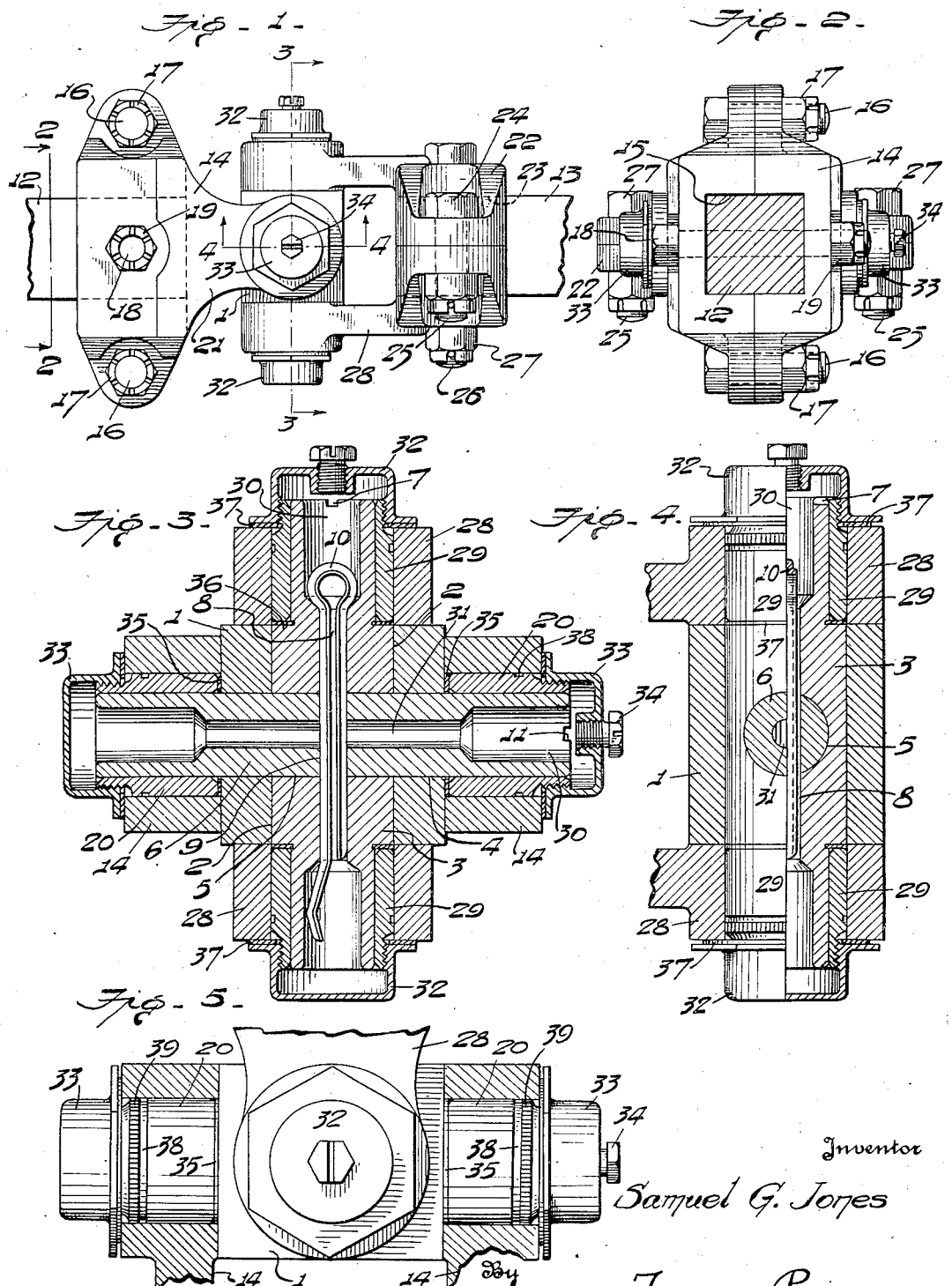
Inventor
Samuel G. Jones
By Towson Price
Attorney Patented May 5, 1936

2,040,002

UNITED STATES PATENT OFFICE 2,040,002

UNIVERSAL JOINT

Samuel G. Jones, Norfolk, Va.

Application January 17, 1931, Serial No. 509,469

7 Claims. (Cl. 64—17)

This invention relates to universal joints and, more particularly, to self-lubricated joints adapted to serve as couplings between driving and driven shafts of a locomotive stoker to permit associated locomotives and tenders to have freedom of motion with respect to one another.

The principal object of my invention, generally considered, is the provision of a universal joint with self-contained lubricant so packed that dirt and other foreign material is kept from the wearing parts, and the joint is adapted to run for a long period of time without attention.

Another object of my invention is to provide a universal joint for the driving mechanism in the type of locomotive stokers in which coal is conveyed forward from the tender under the cab floor to a fire-feeding device in the locomotive.

A further object of my invention is the provision of a self-lubricating universal joint or coupling between rotating shafts, allowing for misalinement of said shafts, which is adapted to be used in a relatively inaccessible place, the lubricant therein serving to maintain the joint in proper operating condition for a long period of time without attention.

Other objects and advantages of the invention relating to the particular arrangement and construction of the various parts will become apparent as the description proceeds.

Referring to the drawing illustrating my invention, the scope whereof is defined by the appended claims:—

Figure 1 is an elevation of one embodiment of my universal joint connecting driving and driven shafts of a locomotive stoker.

Figure 2 is a transverse section on the line 2—2 of Fig. 1, looking in the direction of the arrows.

Figure 3 is a transverse section, on an enlarged scale, on the line 3—3 of Fig. 1, looking in the direction of the arrows.

Figure 4 is a fragmentary transverse sectional view on the same scale as Fig. 3, taken on the line 4—4 of Fig. 1, looking in the direction of the arrows, a portion of the shouldered pin, associated bushings and bushing caps being shown in elevation.

Figure 5 is a fragmentary view corresponding to Fig. 1, but showing portions of a pair of universal joint clips in section with the associated bushings in elevation.

The universal joint or connection between the driving and driven shafts of a locomotive stoker, which involves apparatus for conveying coal from the bottom of the tender under the cab floor to a fire-feeding device in the locomotive, is out of the way and relatively inaccessible. For this reason, it has been thought best to assume that it will be neglected and provide one which has no means for the maintenance of lubricant therein. Because of this, a simple form of joint has been used which involves clips connected to the adjacent ends of the shafts and engaging stub shafts extending from a pivot hub casting. Such a construction has also been provided because it was though that no effective form of lubricating device was practicable for such universal joints because of the limited space allowed for the same, making it necessary to maintain the overall dimensions small.

In accordance with my invention, I have devised a form of universal joint adapted to interchange with the ordinary type of unlubricated joint used with mechanical stokers of the type described but provided with self-contained lubricating material or oil in sufficient quantity and prevented from loss therefrom so that the bearings in the joint are adapted to be maintained efficiently lubricated for a long period of time, thereby greatly increasing the service life of the joint and rendering it unnecessary to inspect, supply additional lubricant, or replace for a long while.

Referring to the drawing in detail, like parts being designated by like reference characters, there is shown one embodiment of my invention involving a center block 1 provided with a relatively large longitudinal aperture 2 therethrough receiving a shouldered pin 3. The center block 1 and shouldered pin 3 are provided with normally registering apertures 4 and 5 adapted to receive a plain pin 6, said shouldered pin 3 being desirably provided with a notch 7 at one end adapted to receive a screw-driver, or the like, so that it may be turned with respect to the block 1 so that the transverse hole in said pin and the corresponding hole in the block register for receiving the pin 6.

In order to maintain the pins 3 and 6 in proper assembled relation, the pin 3 is provided with a longitudinal aperture 8 normally registering with a transverse aperture 9 in the pin 6 and adapted to receive a bifurcated or expansible and headed pin, cotter or other retaining means 10 for holding the pin 6 in proper position with respect to the pin 3. The pin 6, like the pin 3, is desirably provided with a notch 11 at one end for turning it to proper position to receive the cotter or retaining means 10.

The center block and associated pins are disposed between the adjacent ends of preferably non-circular or squared shafts 12 and 13, which shafts may be, respectively, the driving and driven shafts of a locomotive stoker of the type referred to. Attached to the driving shaft 12 are a pair of universal joint clips 14, which clips desirably provide, when assembled, an aperture 15 embracing and fitting the shaft 12, said clips being desirably connected to each other by bolts 16 and castellated or other nuts 17 adapted to be locked in place, and the assembled clips are preferably connected to the shaft 12 by means of a bolt 18 and castellated or other nuts 19 adapted to be locked in place. The clips 14 are desirably provided with bushings 20 pressed in the arms 21 thereof and journaled on the ends of the pin 6, as shown most clearly in Fig. 3.

The driven shaft 13 is likewise provided with a pair of universal joint clips 22 each of which comprises a body portion notched to fit over a shaft and providing, when assembled with a companion clip, an aperture 23 receiving the preferably squared or non-circular shaft 13 and connected together by a pair of bolts and nuts 24 and 25, and to the shaft by a bolt and nut 26 and 27, like the connection between the clips 14 and the shaft 12.

Like the clips 14, the clips 22 are desirably provided with arms 28 in which are pressed bushings 29 which, when assembled, are journaled on the ends of the shouldered pin 3, as shown most clearly in Fig. 3.

In order to provide for properly lubricating the bearing of the bushings 20 and 29 on the ends of the pins 6 and 3, said pins are preferably formed with hollow ends, as indicated at 30, which hollowed portions or relatively large pockets or cavities are connected by the cotter-receiving passage of the shouldered pin 3 and a corresponding longitudinal passage 31 in the plain pin 6, such passages joining at their centers, as shown most clearly in Fig. 3. The outer ends of the bushings 20 and 29 desirably have threadably connected thereto caps 32, one or more of which, designated by the reference character 33, are desirably provided with means for applying or replenishing oil or other lubricating material, such as an oil plug 34.

In order to prevent loss of the oil or lubricating material, a preferably cork washer 35 is provided between the inner ends of the bushings 20 and the associated center block 1, and between the bushings 29 and the shoulders 36 on the pin 3, and a washer 37, desirably formed of felt or cork, between each bushing cap and the corresponding arm of its associated universal joint clip. All of the bushings are desirably grooved, as indicated at 38, and knurled, as indicated at 39, to facilitate the securing thereof to the arms of the universal joint clips 14 and 22.

From the foregoing disclosure, it will be seen that I have devised a universal joint which, although particularly adapted for connecting the driving and driven shafts of a locomotive stoker of the type where coal is conveyed forward from the bottom of the tender under the cab floor to the fire-feeding device in the locomotive cab, yet I do not wish to be restricted to such use, as my universal joint is adapted to connect other shafts, as will be understood.

It will also be clear that, by virtue of the relatively large amount of contained lubricant, and the provision for preventing loss of said lubricant, or contamination thereof by dirt, coal, or other foreign material, the joint will operate for a long period of time without attention, and will be seen to be an improvement over a former type of joint in which the hardness of the material out of which it was made was designed to avoid the lack of lubrication thereof. The joint heretofore described desirably comprises a center block formed of hardened and ground steel, the associated pins and bushings being similarly formed and made to accurately fit one another so as to avoid loss of lubricant, the washers used with the joint, of course, also serving to conserve the enclosed lubricant. The universal joint clips are desirably constructed of cast steel and the bushings of pressed steel.

By virtue of the manufacture of the joint of the materials described, and the efficient lubrication thereof, such a joint is found to render satisfactory service for a long period of time, while being interchangeable with the simple form of non-lubricated joint heretofore used.

Although I have described a preferred form of my invention, and its connection in a particular manner to driving and driven shafts of a locomotive stoker, it will be understood that the joint is reversible because the clips 14 and 22 are interchangeable, and that modifications in use and construction may be made within the spirit and scope of the appended claims.

I claim:—

1. A universal joint connecting driving and driven shafts and comprising a center block formed with a relatively large aperture extending lengthwise and a relatively small aperture merging with and extending transversely thereof, a shouldered pin fitting the large aperture and provided with a transverse aperture registering with the small aperture, a pivot pin passing through said registering apertures, a bifurcated headed pin passing longitudinally through said shouldered pin and transversely through said pivot pin for holding said pins in proper assembled relation, clips each of which comprises a body portion notched, fitting over, and positively connected to a companion clip and said driving or driven shaft, said clips being provided with bushings pressed therein and journaled on the ends of said pins, the ends of said pins having relatively large pockets adapted to contain lubricant and connected by passages, one of said pockets performing the additional function of allowing spreading of the bifurcated pin to locked position, caps threadably engaging the ends of said bushings for holding the lubricant, certain of said caps being provided with lubricating plugs, and washers between said caps and universal joint clips and between said bushings and center block for preventing loss of lubricant.

2. A universal joint connecting driving and driven shafts and comprising a center block formed with a relatively large aperture extending lengthwise and a relatively small aperture extending transversely and merging with said relatively large aperture, a pin fitting the large aperture and provided with a transverse aperture registering with the small aperture, a second pin passing through said registering apertures, a notch in an end of each pin to provide for turning to proper positions, means, formed to prevent undesired axial movement thereof, passing through registering apertures in said pins for holding the latter in proper assembled relation, clips connected together on opposite sides of said driving and driven shafts, means intersecting the shafts and associated clips for connecting said parts, said clips being provided with bushings mounted therein and journaled on the ends of said pins, said pins being made hollow, and caps threadably engaging the ends of said bushings for holding lubricating material in said pins for properly lubricating the engagement of the bushings therewith.

3. A universal joint connecting driving and driven shafts and comprising a center block formed with two pairs of oppositely extending pivot portions formed by hollow pins one of which intersects the other, means, formed to prevent undesired axial movement thereof, extending axially of the intersected pin, and passing laterally through the other pin for maintaining assembly of said pins, clips connected together on opposite sides of said driving and driven shafts, means intersecting each shaft and the associated clips for connecting said parts, said clips being journaled on said pivot portions, the ends of said pivot portions being hollow for containing lubricating material, and caps closing the ends of said pivot portions for preventing loss of said lubricating material.

4. A universal joint comprising a center block formed with a relatively large aperture extending lengthwise and a relatively small aperture merging with and extending transversely thereof, a shouldered pin fitting the large aperture and provided with a transverse aperture registering with the small aperture, a pivot pin passing through said registering apertures, a retainer, formed to prevent undesired axial movement thereof, passing longitudinally through said shouldered pin and transversely through said pivot pin for holding said pins in proper assembled relation, clips adapted for connection to associated driving and driven shafts and provided with bushings pressed in arms thereof, said arms being journaled on the ends of said pins, said pins being provided with cavities normally containing lubricating material, caps threadably engaging the ends of said bushings to prevent loss of said lubricating material, at least one of said caps being provided with a lubricating plug, and washers disposed between said caps and clips and between the inner ends of said bushings and the adjacent portions of the joint for preventing loss of lubricating material.

5. A universal joint adapted to connect driving and driven shafts and comprising a unitary center block provided with a relatively large aperture extending one way and a relatively small aperture merging with and extending transversely of said large aperture, a pin fitting the large aperture and provided with a transverse aperture registering with the small aperture, a second pin passing through said registering apertures, clips each of which comprise a body portion notched so as to fit over an associated shaft and apertured to receive means for positive connection with a companion clip and said shaft, said clips being provided with bushings pressed thereinto and journaled on the end portions of said pins, said pins having relatively large pockets adjacent the ends adapted to contain lubricant and connected by longitudinal passages which merge adjacent the center of the block, a retainer passing through the longitudinal passage of the first-mentioned pin and with end portions received in the end pockets for preventing undesired axial movement, caps threadably engaging the ends of said bushings for holding the lubricant, and washers between said caps and clips and between the bushings and center block for preventing loss of lubricant.

6. A universal joint comprising a center block formed with an aperture extending lengthwise and another aperture merging with and extending transversely thereof, a shouldered pin fitting the first-mentioned aperture and provided with a transverse aperture registering with the second-mentioned aperture, a pivot pin passing through said registering apertures, expansible retaining means passing longitudinally through said shouldered pin and transversely through said pivot pin, means for connecting said joint to associated driving and driven shafts, said means being provided with arms journally mounted with respects to the ends of said pins, said pins being provided with lubricant passages extending from end to end, said passages expanding into lubricant reservoirs at the ends, said reservoirs in the shouldered pin performing the additional function of allowing expansion of the retaining means to locked position, and caps closing the outer ends of said pins to prevent loss of said lubricating material.

7. A universal joint comprising a center block formed with a relatively large aperture and a relatively small aperture merging with and extending transversely thereto, a pin fitting in the large aperture and provided with a longitudinal lubricant passage expanding at its ends into lubricant pockets and a transverse aperture registering with the small aperture, a second pin provided with a longitudinal lubricant passage and passing through said registering apertures, an expansible headed pin received in the lubricant passage of the first-mentioned pin with its head in one lubricant pocket and its other end locked in place in the other pocket in order to hold the pins in proper assembled relation, clips adapted for connection to associated shafts and provided with bushings connected to arms thereof and journaled on the ends of said pins, and caps threadably engaging the ends of said bushings to prevent loss of lubricant.

SAMUEL G. JONES.